J. LAHAYE.
Car Brake.
No. 216. Reissued Apr. 13, 1852.
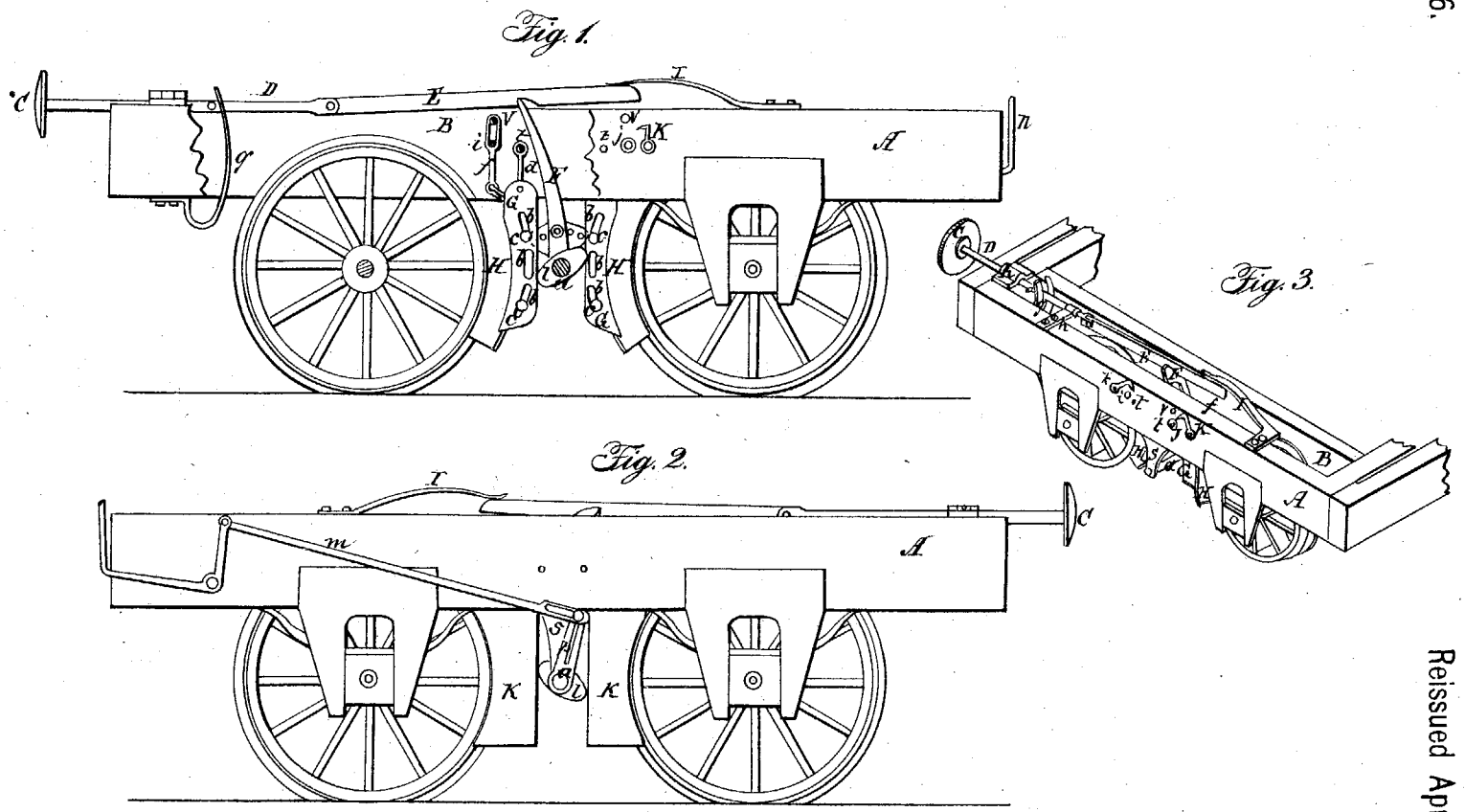
AM. PHOTO-LITHO. CO. N.Y. (OSBORNE'S PROCESS.)

UNITED STATES PATENT OFFICE.

JOHN LAHAYE, OF READING, PENNSYLVANIA.

IMPROVEMENT IN SELF-DETACHING BRAKES.

Specification forming part of Letters Patent No. 5,054, dated April 10, 1847; Reissue No. 216, dated April 13, 1852.

*To all whom it may concern:*

Be it known that I, JOHN LAHAYE, of Reading, Berks county, in the State of Pennsylvania, have made certain new and useful Improvements in Self-Acting Brakes for Railroad-Cars; and I do hereby declare that the following is a full, clear, and exact description of the same, reference being had to the accompanying drawings, making part of this specification, in which—

Figure 1 is a side elevation of a railroad-car frame with my improved brake applied, with a portion of the frame removed the better to represent my improvements. Fig. 2 is an elevation of the opposite side of the car frame, and Fig. 3 is a perspective view of the car-frame with my improvement applied.

The same letters indicate like parts in all the figures.

Many attempts have been made to produce self-acting brakes for railroad-cars—that is, brakes so connected that when the speed of the locomotive is checked the momentum of the train shall cause the brakes to make friction on the wheels to arrest the entire train; but as it is frequently necessary, in addition to stopping a train, to back or reverse its motion, with the view to prevent collisions and for other reasons, self-acting brakes that do not possess the function of disengagement to permit the back motion of the train during the continuance of the forces which cause them at first to bind and make friction on the wheels can be of no practical utility, because brakemen must be employed and at their posts to disengage the brakes when it may become necessary to reverse the motion of the train, and as brakemen must be employed and be at their posts for this purpose they might as well be engaged to work the brakes for all purposes and save the expense and incumbrance of the additional mechanism.

The difficulty, apparently insurmountable, presented to the mind by this subject was, that in reversing the motion of a train there is precisely the same direction of forces which is employed for applying the brakes to stop the train, and that the brakes must be released to permit the back motion of the train while this force continues on them. This difficulty I have, however, surmounted by my invention, which consists in so connecting the brakes with the bumpers or draw-bars that when the speed of the locomotive or the front car is checked the momentum of the train shall act upon and force the brakes against the wheels to make friction thereon, when this is combined with a detaching apparatus connected with the brakes, so that when the motion of the wheels is reversed the connection between the bumpers or draw-bars shall be broken or disconnected to relieve the brakes from the wheels and permit the train to be backed freely, notwithstanding the continuation of the pressure or force on the bumpers or draw-bars by which the brakes were made to bear on the wheels; and in reference to the special devices for applying the above general principle, my invention also consists in connecting the bumpers or draw-bars with the levers which force and hold the brakes against the wheels by means of a detachable catch or hook, which, notwithstanding the backward pressure on the said bumpers or draw-bars, will admit of breaking the said connection, and thus liberate the wheels; and, finally, my invention consists in making that part of the brake which comes in contact with the wheel separate from and adapted to slide or move on the part to which the force is applied for forcing and keeping it in contact with the wheel, so that, notwithstanding the continuance of such force, the reversed motion of the wheel will cause the part in contact with it to slide or move on the other, and thus give the required motion for the disengaging operation, and in this manner effect the detachment between the bumper or draw-bar and the mechanism for forcing the brake against the wheel.

In the accompanying drawings, A and B are side pieces of the car-frame.

C is the bumper, constructed in the usual manner.

D is the shaft of the bumper, working in the bearings *h h*.

E is a bar connected by a hinge-joint to the end of the bumper-shaft D.

F is a lever on the vibrating shaft *a*. The shaft *a* is supported by and has its bearings in the supporters *s s*, made fast to the side pieces A A of the car-frame.

G G are metallic cases or shoes, which receive the backs of the brakes or rubbers H H, (allowing them free vertical play,) their backs bearing against the friction-rollers *c c*, inserted into the curved slots *b b* in the sides of the shoes. The shoes G G are suspended by the joint-pins *t t* between the side pieces, A and B, of the frame. *d d* are the double joint-pieces by which the shoes or cases G G are suspended. The rubbers H H are suspended to the joint-pins *v v* between the side pieces of the car-frame in a position to act upon the wheels.

*f f* are the joint-pieces by which the rubbers are suspended.

*e e* are vertical slots at the upper ends of *f f*, through which the sustaining-pins *v v* pass.

Two small apertures, *i i*, pass through the side pieces, A and B, of the car-frame opposite the lower ends of the slots *e e*. By inserting a bolt, J, through these apertures and through the slot *e* in the joint-piece of the rubber acting on the forward wheel, the rubber will be prevented from lifting, which otherwise it would by the action of the wheel. The forward motion of the after wheel will prevent the rear rubber from lifting.

*k k* are hooks for securing the bolt J in its place when inserted into either of the apertures *i i*.

Cams *l l* are placed on each end of the shaft *a*, between the rubber cases or shoes G G on one side of the car and the rubbers K K on the other. The rubbers or brakes K K are constructed in any well known or usual manner.

The operation of my improved self-detaching brake is as follows: Previous to starting, the bolt J must be inserted into the forward aperture *i*, passing through the slot in the joint-piece *f* of the rubber H, acting on one of the forward wheels to prevent its rising by the action of the same. The rubbers are pressed against the wheels in the usual manner through the medium of the bumper C, the bar E, the lever F, and the cams *l l*, the bumper being acted upon by the locomotive. By reversing the motion of the locomotive and train one of the after wheels of each car elevates the rubber H acting upon it, and by so doing presses the upper end of its joint-piece *f* against the bar E and detaches it from the lever F, and thus prevents the brakes from acting while the cars are moving to the rear.

*g* is a spring acting upon the shaft D of the bumper, throwing it forward and relieving the rubbers when the locomotive has ceased to act upon the bumper.

I is a spring acting on the bar E, and causing the notch on the under side of the same to take hold on the upper end of the lever F.

The brakes may be operated by hand by means of the arm or lever P on one end of the shaft *a*, the connecting-bar *m*, and bent lever *n*, constructed and operated in the usual manner, save that there is a slot in the lower end of the rod *m*, which permits the pin in the end of the lever P to play freely in the same while the brakes are operated by the retarding-power of the locomotive.

It will be obvious from the foregoing that other modes of applying the general and leading principle of my invention may be substituted for the special mode above described.

What I claim as my invention, and desire to secure by Letters Patent, is—

1. In combination with the method of forcing the brakes against the wheels by connecting the brakes or the mechanism which works them with the bumpers or draw-bars, substantially as specified, the method, substantially as specified, of releasing the brakes, notwithstanding the continuance of the forces by which they were applied, by the reversing action of the wheels on the brakes to effect a disengagement of the pressing force, as described.

2. As one of the devices for applying the principle of my invention, connecting by means of a detachable catch or hook, substantially as specified, the bumber or draw-bar with the lever or its equivalent which forces and holds the brake against the wheel, substantially as specified, so that, notwithstanding the continuance of the backward pressure on the said bumper or draw-bar, the connection can be readily broken to relieve the brake, and thus leave the wheel free to run, as specified.

3. Making that part of the brake which acts directly on the wheel separate from but so connected with as to slide freely on the part which receives the action of the mechanism for forcing the brake against the wheel, substantially as described, by means of which, on reversing the motion of the wheel, the one part of the brake in contact therewith is made to slide to give the required motion for effecting the disengagement, as above specified.

JOHN LAHAYE.

Witnesses:

JOSIAH HEARING,

FRANKN. B. MILLER.